United States Patent
Angerer et al.

(10) Patent No.: US 9,547,300 B2
(45) Date of Patent: Jan. 17, 2017

(54) CONTROL DEVICE FOR A MACHINE TOOL AND METHOD FOR CONTROLLING THE MACHINE TOOL WITH EVALUATION MODULE HAVING MEMORY STORING REFERENCE SIGNAL PROFILE

(75) Inventors: Gerhard Angerer, Altenberg (AT); Matthias Hoerl, Oberndorf/Tirol (AT); Hagen Strasser, Pasching (AT); Helmut Theis, Pfarrkirchen (AT); Thomas Weiss, Linz (AT); Klemens Freudenthaler, Linz (AT); Josef Gaggl, Steyr (AT)

(73) Assignee: TRUMPF Maschinen Austria GmbH & Co. KG., Pasching (AT)

( * ) Notice: Subject to any disclaimer, the term of this patent is extended or adjusted under 35 U.S.C. 154(b) by 702 days.

(21) Appl. No.: 13/994,267

(22) PCT Filed: Dec. 19, 2011

(86) PCT No.: PCT/AT2011/050047
§ 371 (c)(1),
(2), (4) Date: Jul. 5, 2013

(87) PCT Pub. No.: WO2012/079108
PCT Pub. Date: Jun. 21, 2012

(65) Prior Publication Data
US 2013/0289760 A1 Oct. 31, 2013

(30) Foreign Application Priority Data

Dec. 17, 2010 (AT) .................................. A 2089/2010

(51) Int. Cl.
*G05B 19/18* (2006.01)
*B21D 5/00* (2006.01)
(Continued)

(52) U.S. Cl.
CPC ............... *G05B 19/182* (2013.01); *B21D 5/00* (2013.01); *B21D 55/00* (2013.01); *G05B 19/19* (2013.01); *Y02P 90/265* (2015.11)

(58) Field of Classification Search
None
See application file for complete search history.

(56) References Cited

U.S. PATENT DOCUMENTS

| 5,714,706 A | 2/1998 | Nakada et al. |
| 2003/0163287 A1* | 8/2003 | Vock .................... A43B 3/0005 |
| | | 702/187 |

(Continued)

FOREIGN PATENT DOCUMENTS

| CN | 101377664 A1 | 3/2009 |
| CN | 101454812 A | 6/2009 |

(Continued)

OTHER PUBLICATIONS

International Search Report of PCT/AT2011/050047, mailed Apr. 23, 2012.

*Primary Examiner* — Mohammad Ali
*Assistant Examiner* — Saad M Kabir
(74) *Attorney, Agent, or Firm* — Collard & Roe, P.C.

(57) ABSTRACT

The invention relates to a machine controller comprising a sensor module (4), an evaluation module (9) and a control module (5), and the sensor module (4) has a convertor which converts a mechanical variable acting on the sensor module (4) into a proportional electric characteristic variable, and the evaluation module (9) is connected via a first signal connection (8) to the sensor module (4) and via a second signal connection (11) to the control module (5). The evaluation module (9) generates a signal profile from the detected electric signal by means of an analysis of potential and/or change, which is compared with at least one reference signal profile stored in a memory means of the evaluation module (Continued)

(9) by means of a comparison module of the evaluation module (9), from which the control signal is generated. Furthermore, at least one of the two signal connections (8, 11) is based on a wireless design.

14 Claims, 5 Drawing Sheets

(51) Int. Cl.
  *B21D 55/00* (2006.01)
  *G05B 19/19* (2006.01)

(56) References Cited

U.S. PATENT DOCUMENTS

| 2007/0247306 | A1 | 10/2007 | Case, Jr. |
| 2008/0007417 | A1 | 1/2008 | Weishaar et al. |
| 2009/0026778 | A1 | 1/2009 | Murayama et al. |
| 2009/0076653 | A1 | 3/2009 | Hietmann et al. |
| 2009/0267787 | A1* | 10/2009 | Pryor ............... G08B 21/0213 |
| | | | 340/686.6 |
| 2009/0284368 | A1 | 11/2009 | Case, Jr. |
| 2010/0250089 | A1 | 9/2010 | Buslepp et al. |
| 2010/0263518 | A1* | 10/2010 | Nishitani ............... G10H 1/00 |
| | | | 84/612 |
| 2010/0326800 | A1 | 12/2010 | Sperrer |
| 2012/0293326 | A1 | 11/2012 | Case, Jr. |
| 2013/0265157 | A1 | 10/2013 | Case, Jr. |
| 2014/0244395 | A1 | 8/2014 | Case, Jr. |

FOREIGN PATENT DOCUMENTS

| EP | 0 525 539 A2 | 2/1993 |
| JP | S63-45592 U | 3/1988 |
| JP | H09-68973 | 3/1997 |
| JP | 2000-046291 A | 2/2000 |
| JP | 2007-069261 A | 3/2007 |
| JP | 2010-264019 A | 11/2010 |
| WO | 2006/056349 A1 | 6/2006 |
| WO | WO 2007/051628 A1 | 5/2007 |
| WO | WO 2007/062441 A1 | 6/2007 |

* cited by examiner

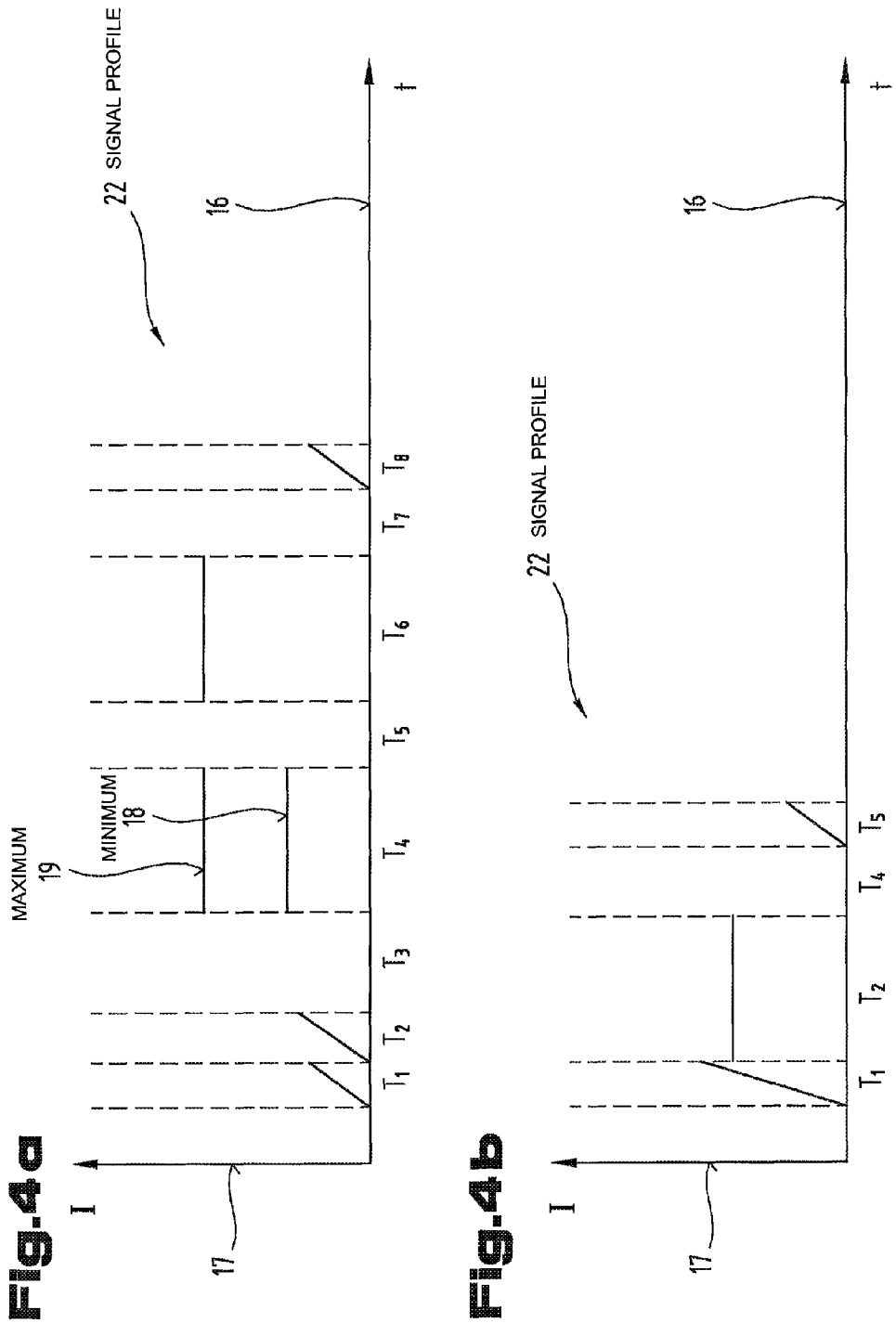

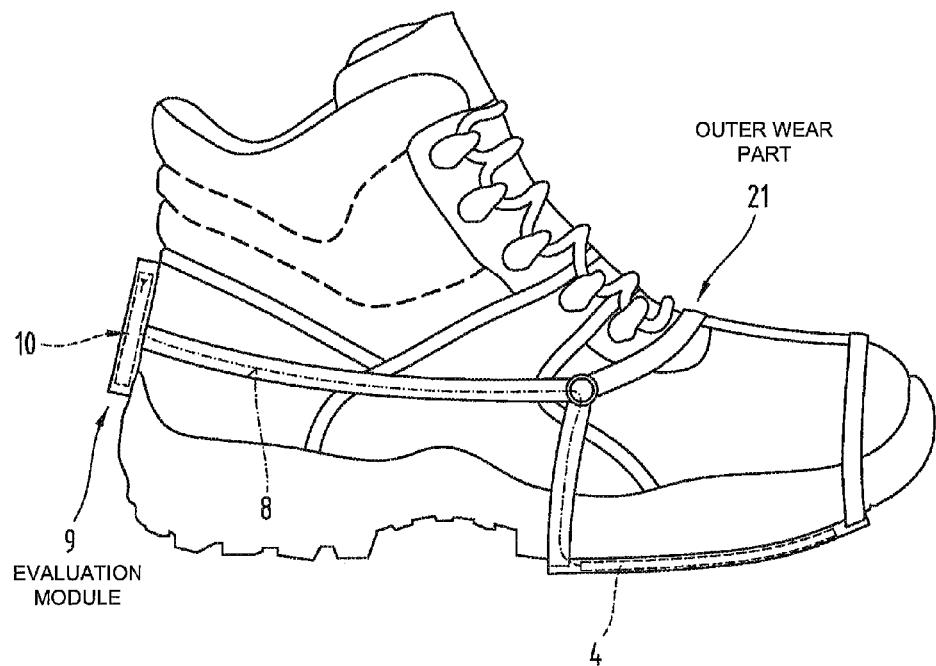

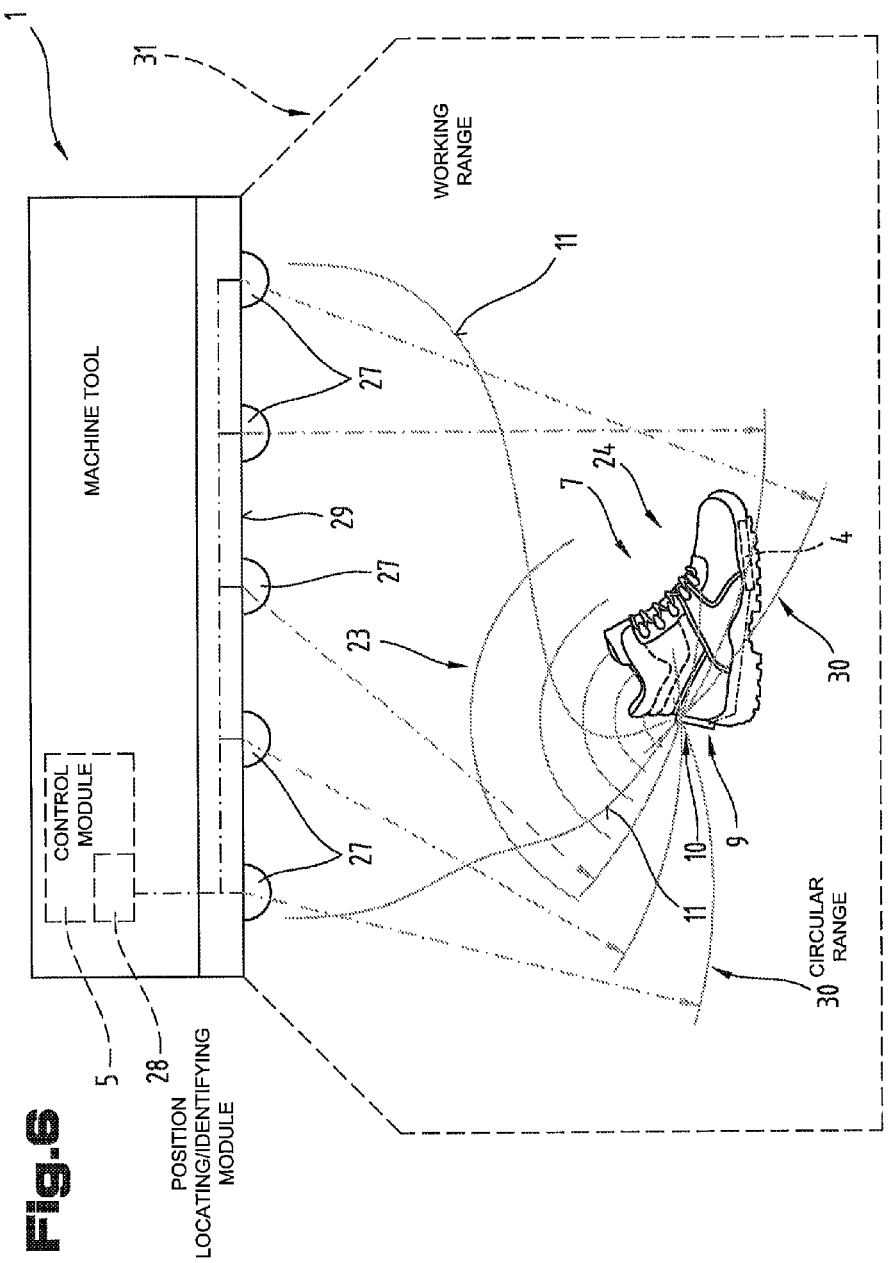

US 9,547,300 B2

CONTROL DEVICE FOR A MACHINE TOOL AND METHOD FOR CONTROLLING THE MACHINE TOOL WITH EVALUATION MODULE HAVING MEMORY STORING REFERENCE SIGNAL PROFILE

CROSS REFERENCE TO RELATED APPLICATIONS

This application is the National Stage of PCT/AT2011/050047 filed on Dec. 19, 2011, which claims priority under 35 U.S.C. §119 of Austrian Application No. A 2089/2010 filed on Dec. 17, 2010, the disclosure of which is incorporated by reference. The international application under PCT article 21(2) was not published in English.

The invention relates to a machine controller, comprising a sensor module, an evaluation module and a control module.

One requirement placed on a machine controller, especially a machine controller for a bending press or press brake, is that of guaranteeing control of the bending or pressing function, in particular if it is necessary for the operator to carry out manipulating tasks. Precisely when producing small parts or parts with complex bending lines, it is usually necessary for the operator to orient the workpiece correctly relative to the bending die until the start of the bending operation and initiate the bending operation by operating a trigger element. Devices are known from the prior art as a means of ensuring that no body parts are disposed between the press beam and the stop beam of the bending die during the bending operation, thereby preventing any risk of injury to the operator. In order to trigger the bending operation, known machine controllers have a control element in the form of a foot pedal, which foot switch is evaluated by means of a control module of the machine controller, after which the drive means of the machine tool is activated in order to run the bending operation or deactivated in order to terminate the bending operation and stop the bending die or move it back to the initial position.

JP 2007-069261 A discloses an operating element, in which the switch element is disposed in a shoe, thereby enabling the operator to move around essentially freely in the area of the machine tool and initiate the bending operation at any time without having to displace an operating switch of the type known to date at the desired location of deployment, and the switch status of the operating element is also wirelessly transmitted from the shoe to a control module. The movement of the press beam is controlled on the basis of the switch status of the sensor in the operator's shoe.

When operating the machine, however, in addition to a pure on-off operation or a bending and return movement of the press beam, it may be necessary to transmit other control commands to the control module without the operator having to turn his attention away from the working area, which would increase the risk of incorrect operation or injury. Particularly when working with machines, it may happen that an emergency situation arises and it becomes necessary to stop the movement of the press beam immediately or effect an immediate reversing movement. To this end, known machine tools usually have one or more operating elements for emergency situations disposed in the region of the machine tool. This design has a disadvantage, however, because a safety switch element of this type requires additional circuitry and equipment and the circuit components needed for this design restrict flexible deployment of the machine controller.

There is nothing disclosed in the prior art whereby, in addition to a pure start-stop message, additional variable control data can be transmitted by the operator to the machine controller.

Accordingly, the objective of the invention is to propose a machine controller which enables an operator to initiate control functions without his freedom of movement in the vicinity of the machine tool being restricted.

This objective is achieved by the invention due to the fact that the evaluation module has a threshold value indicator, and the evaluation module creates a signal profile from the detected electric signal by running a potential and/or a change analysis, and the evaluation module also has a memory means in which a reference signal profile is stored. The evaluation module also has a comparison module, which compares the detected signal profile with the stored signal profile and generates the control signal. At least one signal connection is wirelessly established between the control module and evaluation module respectively between the evaluation module and sensor module. The particular advantage of the design proposed by the invention resides in the fact that, because of the threshold value indicator of the evaluation module, in addition to a state control system of the known type with two control states, a plurality of other control options are available. The convertor of the sensor module generates an electric characteristic variable which is proportional to the physical variable acting on the sensor, as a result of which a plurality of threshold values which are dependent on the intensity of the active variable can be derived. When a potential analysis of the detected, electric characteristic variable is run by the threshold value indicator, a plurality of different intensity stages acting on the sensor module can be evaluated. When a change analysis is run by the threshold value indicator, in addition to or as an alternative to the detected absolute value of the acting physical variable, the speed of the rise or fall of the action is also determined, thereby enabling a control signal to be derived therefrom for the travel speed of the press beam. In another possible embodiment, several signal profiles can be stored in the memory means so that several control signals can be generated.

Also of advantage is another embodiment whereby the sensor module is disposed in an item of clothing, in particular a shoe. It is usually a safety requirement that operators working in the area of machine tools are equipped with appropriate footwear in order to reduce the risk of injury. Such footwear usually has enough space to accommodate components of the machine controller proposed by the invention, and in particular the sensor module or the sensor module and the evaluation module can be disposed in an item of clothing. Given that the operator is usually guaranteed to have contact with the ground through the shoes, including in situations of danger and hence also in emergency situations, a reliable movement is always possible so that a control signal can be unambiguously derived from the signal analysis run by the evaluation module. Due to the design proposed by the invention, it is always possible in particular for the operator to undertake a control action without having to turn his attention away from the workpiece to be processed and the machine tool. Based on the embodiment proposed by the invention, the operator's full attention always remains focused on the workpiece and on the machine tool. It is possible to opt for an integrated arrangement in the shoe, in which case the sensor module is embedded in the sole material, for example, and is therefore protected from excessive mechanical stress by this material. However, it would also be possible for the sensor module to be designed as a sole insert, in which case it can be inserted in any shoe without the need for a special shoe structure. In any event, the design is such that the operator's movement is not restricted.

Another embodiment intended to extend the application options is of advantage, whereby the sensor module is designed as an item of outer clothing and is disposed on an item of clothing. For example, the sensor module may be designed as a pull-over shoe or alternatively as a glove and can therefore be worn in addition to existing work clothing at any time. A pull-over shoe may also have an operating part, which is disposed on the outer shoe of the operator by means of a length-adjustable clamping device.

Based on another embodiment, the sensor module and the evaluation module are integrated, and the signal connection between the integrated modules and the control module is of a wireless design. The advantage of this design is that a plurality of machine tools can be controlled with it because the control signal already generated in the control module can be transmitted wirelessly. An operator with a generically designed arrangement of the sensor and evaluation module can therefore control several machine tools without having to provide an individually configured machine controller for this purpose in each case.

In the case of another embodiment, the sensor module and evaluation module are disposed in a push-in module, the advantage of which is that this module may be disposed in a specifically provided recess, for example of a shoe. It is of particular advantage if a universal recess is provided in the shoe, which is closed off by means of a closure part during manufacture of the shoe, in which case the shoe is fully functional and the closure part can be replaced by the module arrangement as and when necessary.

In view of the fact that quite a high noise level usually prevails in the area around machine tools, it is of advantage if an actuator is connected to the evaluation module. Accordingly, when the evaluation module detects a valid signal profile or the control module has received a valid control command, the operator is provided with a tactile indication, in particular a mechanical-tactile indication. The actuator may be provided in the form of a vibration motor, for example, disposed in the item of clothing, and transmits its vibrations to the body part so that the operator does not have to divert his concentration away from the workpiece but still receives feedback that the control command or signal profiles has been positively identified.

Also of advantage is another embodiment whereby the evaluation module and the control module are integrated and the signal connection between the sensor module and the integrated modules is based on a wireless design. Accordingly, a machine controller can be obtained in which the sensor module is as simple, compact and inexpensive as possible, and the complex generation of the signal profiles and the comparison which has to be run can be accessed via the integrated arrangement of the evaluation module and control module on more processing resources, thereby enabling more complex analyses to be run.

Based on another embodiment, at least one series of time-discrete signal values-change values is stored in the signal profile, the advantage of which is that switch stages are created and, by contrast with the system known from the prior art, therefore, more than two control states can be created. Given the fact that a proportional electric characteristic variable is generated from the physical variable acting on the sensor module, a series of actions can therefore be detected and evaluated as control signals, which series must comprise a specific time-based sequence of consecutive actions. Consequently, the operator can generate a control signal by acting on the sensor module several times because the detected signal profile is compared with stored reference signal profiles. In particular, however, this also prevents incorrect operation because a random contacting caused by the movement of the operator cannot lead to erroneous triggering of a control signal.

Taking a similar approach is another embodiment whereby a time during which there is a rise or a drop below the threshold value is stored in the signal profile. For example, a command sequence can be initiated by the operator by allowing a physical variable to act on the sensor module for a certain period of time, after which the evaluation module detects the start of a signal profile and compares the subsequent detected signals with the signal pattern stored in the reference profile. However, the particular advantage of this embodiment is that it is not possible for a faulty control signal to be generated because the signal profile can only be generated by a deliberate and hence usually longer action. Any random action caused by a movement of the operator will therefore be ignored as irrelevant. Along the same lines, it should also be pointed out that a pause can also be evaluated, in other words there may be a certain period of time in which there is no action on the part of the operator.

Based on another embodiment, the convertor is provided in the form of a pressure sensor, for example a pressure-sensitive resistor or a pressure-dependent capacitance, the advantage of which is that, for example, a sensor of this type may serve as a frequency-determining component in an electric oscillating circuit, in which case a force acting on the sensor module has a direct effect on the resonance frequency of the oscillating circuit, which will also change the transmission parameters of the wireless signal connection, and this can be evaluated by the remote station and interpreted as a control signal.

Based on another embodiment, the convertor is provided in the form of an acceleration sensor, the advantage of which is that more degrees of freedom are possible in terms of detecting physical characteristic variables. In the case of a force, detection is essentially possible in one direction only and only intensity and/or an increase or decrease in the force can be detected. In the case of an acceleration sensor, depending on the design of the acceleration sensor, forward-reverse movements and/or up-down movements are detected. In an embodiment based on a sensor with 3 axes, movements are detected in all three spatial directions, from which a correspondingly finely staged signal profile can be created and from this a correspondingly broad variety of control signals can be generated. In another embodiment, it is also possible to provide an inertial sensor to enable rotary as well as translatory accelerations to be detected.

Providing the convertors in the form of a threshold sensor has an advantage in that a multi-point switch with a spring-biased rocker, for example, has several explicit switch stages and the operator therefore has to pay less attention to the precision of the contacting. Also of advantage is another embodiment where such a threshold sensor transmits a sensory feedback to the operator so that he is clearly able to tell that the respective threshold switching stages have been reached.

Since the sensor module and optionally the evaluation module needs a lesser amount of electrical energy in order to run the analysis or establish the wireless transmission, it is of advantage if the convertor is provided as an active component, so that an electric voltage is also created by the active force or by an acceleration. The convertor may be a piezoelectric element, for example, or an electromagnetic convertor, in which case the voltage or the rise in the output voltage may be used as a measure of the active force or acceleration.

Based on another embodiment, the wireless signal connection is provided in the form of a local area data link, in particular a high-frequency data link. Examples of this are local area data links such as BLUETOOTH or ZIGBEE. However, it would also be possible for a frequency corresponding to the detected signal profile to be emitted, which is picked up by the remote station and converted into control commands accordingly. In another embodiment, a two-way connection is provided so that the control module can unambiguously detect the presence of a sensor module in the immediate vicinity of the machine tool.

In yet other embodiments, the control module has a position-locating or position identifying module with a co-operating receiver station and a wireless third signal connection is established between the evaluation module and the control module, and this third signal connection is preferably based on ultra-sound. The position-locating or position-identifying module determines a travel time difference for an ultra-sound signal emitted across this third signal connection and an HF-signal emitted across the second signal connection at the same time by means of a co-operating receiver station, from which information pertaining to position is determined.

Based on the claimed embodiment with a co-operating receiver station, a radius within which the operator is located in the area around the co-operating receiver station can be determined by evaluating the time difference. If, based on another embodiment, at least two co-operating receiver stations are provided, a radius can in turn be determined for each co-operating receiver station and the position of the operator can be determined by intersecting the two radii. The more co-operating receiver stations are provided, the more accurate this intersection point and the position of the operator will be and the more likely it is that location of the position or identification of the position can be run without interference. Since machine tools are usually of a very solid design for reasons of stability, preferably being made from metal, there is a risk in the case of the second and third signal connection that the signal connection will be detrimentally affected due to design aspects of the machine tool or by the operator himself. However, if several co-operating receiver stations are provided, this will increase reception reliability and hence the reliability of the process of locating the position or determining the position.

Another option is for signals to be transmitted via the second and third signal connection to be sent asynchronously or offset in time. Given that the control commands are transmitted across the second signal connection, the latter is preferably active whenever a control of the machine tool is initiated by the operator. In this case, the third signal connection can be activated by the evaluation module, which then periodically transmits a signal, for example. In order to determine the travel time difference in this instance, the transmitter and receiver must be synchronized, in other words the position locating or position identifying module must know the instant of transmission, which can be achieved for example by transmitting a time stamp with the transmission across the second and third signal connection.

Other possible embodiments are ones where the position locating or position identifying module evaluates only the travel time differences of the second signal connection for several co-operating receiver stations which corresponds to a radio-based location, or a purely ultra-sound based position locating or position identifying system is possible where only the third signal connection is evaluated.

The invention further relates to as method of operating a machine tool, comprising a machine controller as proposed by the invention. An effect of a physical variable is detected by the convertor of the sensor module and is transmitted as an electric characteristic variable to the evaluation module, which generates a signal profile from it, in which signal profile a correlation of a time period to a signal value or a change in signal value is stored, and the evaluation module also compares the generated signal profile with at least one stored signal profile and generates the control signal on this basis. Physical variable should be understood as meaning the effect of a force and/or an acceleration, for example. The particular advantage of the method proposed by the invention resides in the fact that by running a time analysis of the electric characteristic variable emitted by the convertor, a signal profile is generated in which a time sequence of the change in a signal value or a time conformity of signal value thresholds is stored. Comparing the detected reference signal profile with a stored one enables the operator of the machine controller to output a plurality of different control commands without having to turn his attention away from the machine tool or workpiece to be processed. In particular, by storing several signal profiles, it is advantageously possible to transmit a plurality of control signals to the control module and hence a plurality of different operating actions.

Based on one embodiment, the evaluation module determines the rate of change in the electric signal, as a result of which the operating speed of the sensor module may be used as a basis for generating a signal profile and hence a control signal.

Also of advantage is another embodiment whereby the evaluation module determines the period during which there is a rise above or drop below the threshold value, because this prevents the risk of incorrect operation and in particular in turn results in a plurality of control commands by determining different control signals. For example, a signal profile may be characterized by the fact that a physical variable with a specific intensity must act on the sensor module in a specific sequence and conforming to certain times. A signal profile may also be characterized by the fact that in order to detect a valid signal profile, a force or an acceleration must always be effective for specific period of time at the start, based on a predefined movement on the sensor module.

In order to ensure an assignment of the sensor module to the evaluation and control module, the sensor module of one embodiment has an identification code which is transmitted to the evaluation module and to the control module. This ultimately ensures that only the sensor module with the correct or assigned identification code can communicate or interact with the control module. This enables several machine controllers to be operated adjacent to one another without incurring the risk of an incorrect assignment and hence incorrect operation due to the wirelessly established communication route. However, the identification feature may also be set up in such a way, for example, that the identification features can be read, for example by opting for an RFID feature, independently of the signal transmission.

Based on another embodiment, when a threshold value for the change in signal value is exceeded, an alarm signal is output as a control signal. The particular advantage of this in terms of determining emergency signals is that emergency signals are usually characterized by a very rapid or sudden action. In the case of a foot switch of the type known to date, after pushing down the switch rocker, in particular having overcome a fixed standard value of 350 N, the travelling movement of the press beam is immediately halted. In the case of the claimed method, the operating force and/or the operating speed of the sensor module may be applied as a measure of the urgency of a control command. As a result, a variable travel speed of the press beam can be derived, which is of particular advantage if the press beam has to be moved to the workpiece slowly to enable an accurate alignment of the workpiece.

To provide a clearer understanding, the invention will be explained in more detail below with reference to the appended drawings.

These are highly schematic, simplified diagrams illustrating the following:

FIG. 4 illustrates a) and b), being examples of a signal profile;

FIG. 5 illustrates another possible embodiment of the machine controller proposed by the invention where the sensor module and the evaluation module are designed as an item of outer clothing;

FIG. 6 shows an operating diagram of the position locating or position determining system.

Figure 1:
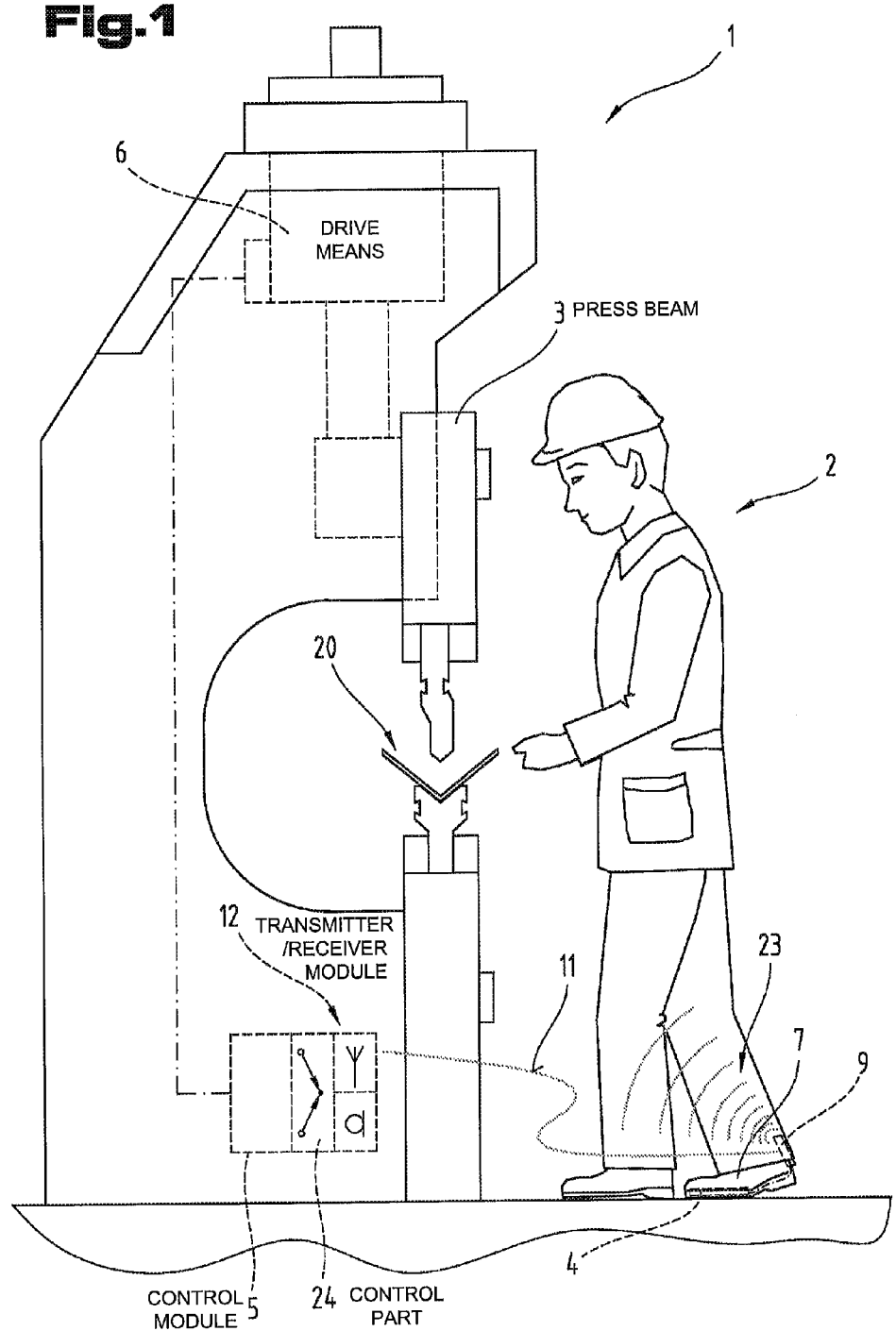
FIG. 1 illustrates a machine controller proposed by the invention in a machine tool.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described. Individual features or combinations of features from the different embodiments illustrated and described may be construed as independent inventive solutions or solutions proposed by the invention in their own right.

All the figures relating to ranges of values in the description should be construed as meaning that they include any and all part-ranges, in which case, for example, the range of 1 to 10 should be understood as including all part-ranges starting from the lower limit of 1 to the upper limit of 10, i.e. all part-ranges starting with a lower limit of 1 or more and ending with an upper limit of 10 or less, e.g. 1 to 1.7, or 3.2 to 8.1 or 5.5 to 10

FIG. 1 illustrates a machine tool 1, in particular a press brake, with a machine controller as proposed by the invention. In order to run the predefined work steps of adjustment work and control actions, the operator 2 must in particular place the workpiece 20 to be processed in the machine and orient it accordingly before then initiating the work operation, which in the case of a bending press involves triggering the movement of the press beam 3. In the case of known machine controllers, this was usually done using a foot-operated switch, which had to be oriented and positioned in the operator's working area and operated in order to initiate the travelling movement and released in order to activate the return movement of the press beam. However, the known foot-operated switch permitted only two switching states, which severely restricted the flexibility of the operating system. In running the work steps, for example, it is of advantage if the press beam 3 is moved towards the workpiece 20 with a slow travelling movement or a speed proportional to the operating force and held in position there so as to then perform the bending operation by a further travelling movement. However, it is not possible to emit such a complex command with a known foot switch. In addition, the known foot switch has to be constantly re-positioned so that it is always disposed in working range to enable operation, regardless of the work steps to be implemented.

The advantage of the machine controller proposed by the invention, on the other hand, is that a sensor module 4 and preferably an evaluation module 9 is disposed in or on an item of clothing 7 of the operator 2, for example in or on a shoe, and a control module 5 incorporating means for activating and deactivating at least one drive means 6 in order to initiate a processing step is disposed in or on the machine tool 1. Such a means might be provided in the form of a speed controller, electromechanical or electronic switch for a drive motor, hydraulic control group, valve group.

However, the main advantage of the machine controller proposed by the invention is that the second signal connection 11 between the evaluation module 9 and the control module 5 and the first signal connection between the sensor module 4 and the evaluation module 9 is based on a wireless design so that the operator is not restricted in terms of his freedom of movement, in other words can issue commands from every permitted position in the area of the machine tool 1, in addition to which, due to the evaluation module disposed in the signal path, different control commands can be generated in addition to the start-stop functions.

In accordance with the invention, however, provision is also made so that two or more operators can work simultaneously on the machine tool, for example if the workpiece to be processed is too big for a single operator. The individual operators are then each provided with a sensor module and optionally also the evaluation module disposed on or in an item of clothing and the control module will not permit the working movement of the machine tool until all of the operators assigned to working on the machine have issued the authorization signal.

Provision is also made so that only one assigned operator or an assigned operator group can operate the machine tool with the machine controller proposed by the invention. Accordingly, a position locating or position determining system is provided, by which a check is run at least prior to triggering the working movement of the machine tool to ascertain whether this operator issuing a command is in the permitted working area. With known foot switches, it was possible for the travelling movement to be initiated even though the operator was in a region of the machine considered as dangerous. Now, based on a preferred embodiment, an acoustic third signal connection 23 exists between the evaluation module 9 and control module 5 in addition to the wireless second signal connection 11. A position-locating or position identifying module 28 of the control module 5 evaluates the travel time difference of the signals emitted simultaneously from the evaluation module 9 across the second 11 and third 23 signal connection and from this, information pertaining to position is determined. Further details on this aspect may be found in the description of the drawings below.

Figure 2:
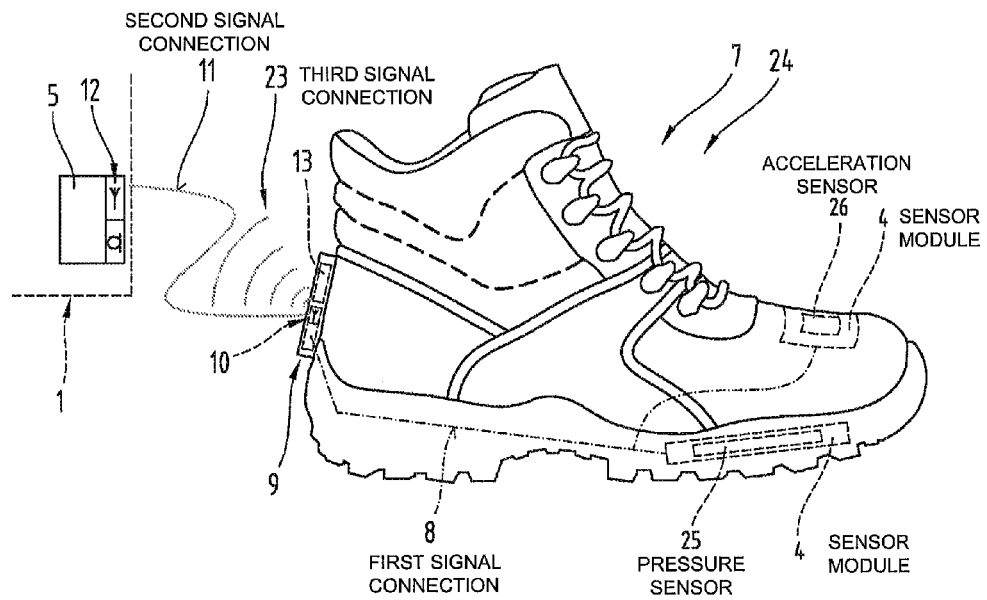
FIG. 2 illustrates one possible embodiment of the machine controller proposed by the invention where the sensor module and the evaluation module are disposed in an integrated arrangement in an item of clothing.

FIG. 2 illustrates one possible embodiment of the machine controller proposed by the invention where the sensor module 4 is disposed in an item of clothing 7, in particular a shoe. The sensor module 4 is connected to the evaluation module 9 via a first signal convection 8. This evaluation module 9 has a transmitter and receiver module 10, which wirelessly establishes a connection to a transmitter and receiver module 12 of the control module 5 of the machine tool 1, not illustrated, via a second signal connection 11, in particular across an HF-connection. An acoustic convertor is also disposed in the transmitter and receiver module 10 of the evaluation module 9, which simultaneously establishes a third signal connection 23 via the second signal connection 11 to the transmitter and receiver module 12 of the control module 5, in particular by emitting an ultra-sound signal. In order to receive the ultra-sound signal, the transmitter and receiver module 12 of the control module 5 has an acoustic-electric convertor.

The evaluation module 9 can be configured so as to operate passively, in which case it does not have a separate power supply, although another embodiment is possible whereby an electric energy storage 13 is provided, which supplies the evaluation module 9, in particular the transmitter and receiver module 10, and optionally the sensor module 4 with electrical energy. However, it is also possible for the sensor module 4 to be based on an active configuration, in which case a force-induced effect or an acceleration on the sensor module generates an electric voltage which can be used on the one hand to operate the evaluation module 9 and as a means of establishing the second signal connection 11. In another embodiment, however, the voltage generated by the sensor module 4 may additionally be used to charge the electric energy storage 13. Consequently, the movement of the operator in front of the machine tool, in addition to outputting a changing electric characteristic variable in order to generate a signal profile, also continuously generates electrical energy in order to supply the components of the machine controller disposed in the item of clothing 7 with electrical operating energy.

In another embodiment, the second signal connection 11 may be based on a two-way configuration, in which case the evaluation module 9 and the control module 5 each have transmitter and receiver means, as a result of which the operator can be provided with an acknowledgement by the control module 5. In this case, the sensor module 4 may also function as an actuator, for example if the sensor module 4 is provided in the form of a piezoelectric element, both a sensor and an actuator functional are possible. However, provision may also be made so that an additional actuator module is provided, although this is not illustrated in the drawing, which enables a tactile, in particular a mechanical tactile acknowledgement to be emitted to the operator, for example. This actuator may be provided in the form of a vibrator, for example, which transmits its vibrations to the body part when activated. Especially in a production unit with a plurality of machine tools, a high noise level usually prevails so that a mechanical tactile acknowledgement signal pertaining to a recognized signal profile and a control signal derived from it offers an advantage because it cannot become lost in the general to and fro of operating messages.

The sensor module 4 preferably has two convertors disposed at different positions of the item of clothing. In the case of a shoe, for example, a pressure sensor 25 is disposed in the region of the ball of the foot and an acceleration sensor 26 is provided in the region of the front of the foot or in the heel region. However, the positions may vary depending on the physical variables to be detected.

To simplify the rest of the description, the item of clothing 7 incorporating the sensor module 4 and the evaluation module 9 will be referred to as control part 24.

In order to assign the control part 24 to a control module 5, the second 11 and/or the third 23 signal connection is based on a coded configuration. To this end, a unique code is assigned to the control module 5 during installation of the machine tool, which is selected so that even if there is a dense arrangement of machine tools in a production facility, the codes cannot be mutually affected by one another, in other words the best possible security against interference is guaranteed. During the initial assignment of a control part 24 to the control module 5 of the machine tool 1, this machine code or a code derived from it is transmitted across the second signal connection 11 to the evaluation module 9. The transmitter and receiver module 10 of the evaluation module 9 uses this transmitted code as a means of encrypting the signal transmission across the second 11 and preferably also across the third signal connection 23. Optionally, the code transmitted by the evaluation module may also be supplemented by a code specific to the evaluation module, thereby enabling at least the second signal connection 11, which is valid only for the specific combination of the evaluation module and control module, to be encrypted. This ensures that only the assigned control part can establish a communication with the control module.

Another embodiment is possible using this coding, whereby several user profiles are stored in a memory means of the control module 5, which can be linked to the coding of the control part so that every operator logging into the machine tool can access his specific machine settings and in particular the machine tool can be set up to the specific requirements of the operator.

Figure 3:
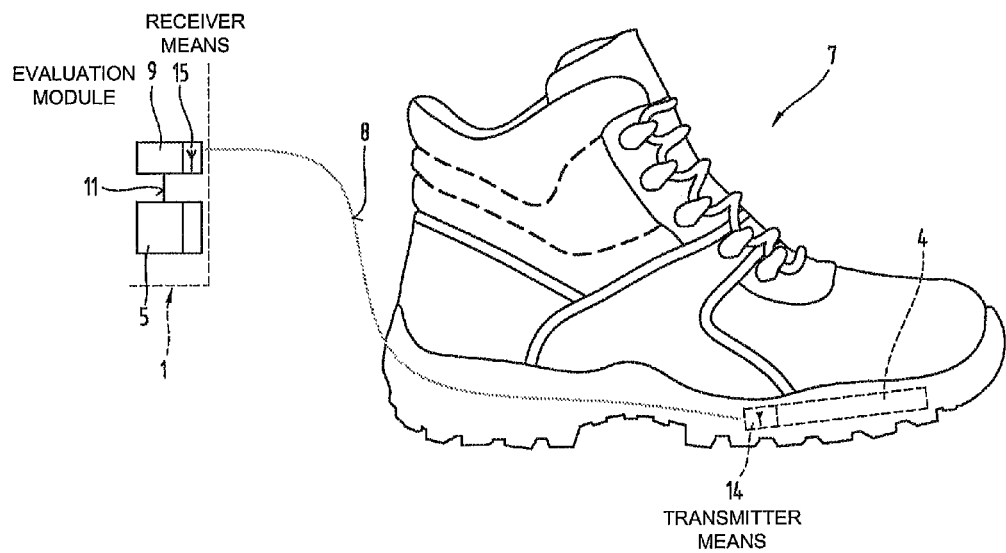
FIG. 3 illustrates another possible embodiment of the machine controller proposed by the invention where only the sensor module is disposed in an item of clothing.

FIG. 3 illustrates another possible, particularly simple and very inexpensive embodiment of the machine controller proposed by the invention where only the sensor module 4 is disposed in the operator's item of clothing 7 and the first signal connection 8 to a receiver means 15 of the evaluation module 9 is established wirelessly via a transmitter means 14. The evaluation module 9 is connected via the second signal connection 11 to the control module 5. In this configuration, the sensor module 4 is preferably based on a passive design, in which case the force or acceleration acting on the sensor module 9 is used to detect the electric characteristic variable and also to generate the electrical energy needed for detection purposes. For example, this can be achieved by using a piezoelectric element or an electromagnetic convertor. However, another option is one where the sensor module 4 is a component of an electric oscillating circuit used to determine frequency, for example a variable resistor or variable capacitance, and the transmitter and receiver module 12 of the evaluation module 9 is provided in the form of a transmitter and receiver means which emits an energizing electromagnetic wave to the oscillating circuit and evaluates the variations of the oscillating circuit frequency on the basis of the force acting on the sensor module 4 and generates the signal profile on this basis.

This embodiment has a particular advantage in that only the sensor module 4 is disposed on the item of clothing 7, whilst the more cumbersome evaluation module 9 is disposed in the region of the machine tool where the availability of space and resources presents less of a problem. In view of the fact that the item of clothing 7 can be subjected to wear during normal use, making replacement necessary, it is of advantage if only the sensor module is rendered unusable as a result and the evaluation module does not have to be disposed of as well. In the embodiment illustrated in FIG. 2, the evaluation module could be based on a design which can be coupled, in which case it can be transferred from one item of clothing to another. Since the sensor module 4 is also exposed to constant stress, it is of advantage if it is based on as simple a design as possible in order to withstand stress on the one hand and, on the other hand, in the event of potential damage due to stress or when replacing the item of clothing, to incur only the minimum of costs.

FIGS. 4a and 4b illustrate two possible signal profiles 22 in a highly schematic diagram. Plotted on the time axis 16 is a measure of the intensity 17 of the effective physical variable. To enable the evaluation module to ascertain without any ambiguity when the start of a signal profile 22 occurs in order to rule out a detected signal emitted due to the natural movement of the operator in the item of clothing, the operator must initiate a start sequence at the beginning. To this end, he must apply a force to the sensor twice in consecutive actions with increasing intensity for example, as depicted in sections T1 and T2.

The increase in intensity should be such that it is possible to detect a moderately strong force and a mean increase in speed. These parameters should be selected so that natural movement will not cause initiation of a signal profile 22. In order to differentiate a natural movement, provision is also made so that prior to the start sequence, the sensor module is held in idle mode for a certain period, thereby ensuring that the subsequent start sequence can be unambiguously recognized as such. The start sequence may also be based on a sharp impact, in other words the operator puts the shoe down hard in a short forward movement.

In the case of this start sequence, no force should be applied to the sensor module for a specific period of time (section T3) and after that, a constant as possible a force in a range between a minimum 18 and a maximum 19 must be applied for a period T4. After this phase, there is another pause (section T5), and following this pause a force should be applied as constantly as possible with a force value higher than the value of force previously applied (section T6). This is again followed by a pause (T7) during which no force is applied. The signal profile 22 is terminated by a brief increase in force but with a reduced increase in speed and intensity (T8).

The diagram schematically illustrates how both the increase in force applied to the sensor module and the intensity of the force applied can be stored in the signal profile. Accordingly, by combining these two features, a plurality of different signal profiles are generated and in particular a very fine control of the work actions of the machine tool can be undertaken. For example, it is possible to influence the travel speed of the press beam due to the intensity of the force applied to the sensor module if the corresponding actions are taken by the operator beforehand and the evaluation module analyzes the signal profile and generates a corresponding control signal.

In particular, however, it should be pointed out that the illustrated curves should be construed as merely examples. Especially as regards the start and end sequences, numerous options for unambiguously recognizing the start of a signal profile would be conceivable. The repeat action illustrated, representing a double clicking action, represents just one embodiment.

Another advantage of the machine controller proposed by the invention is illustrated in FIG. 4b, whereby alarm signals can be derived from the evaluation of the increase in force or intensity. An emergency situation can be initiated for example if a very short, very sharp rise in force occurs (section T1), immediately followed by the application of as constant as possible a force of high intensity for a period (section T2). The alarm signal is confirmed by a brief rise in force (T5) following a brief pause (T4). If the operator or the workpiece is at risk, it is of advantage if the operator is able to trigger an alarm without having to change his position because under certain circumstances this might not be possible or might not be so without some difficulty.

Accordingly, a significantly improved way of operating machine tools is achieved whereby the operator of such a machine has the freedom to initiate a plurality of possible commands without having to divert his attention from the working area or workpiece. Especially in dangerous situations, this offers the advantage that the operator is not forced to operate an external switch but can initiate an alarm command without having to change his position and therefore halt any further movement of the tools of the machine or reverse the movement underway at any one time.

FIG. 5 illustrates an example of another possible embodiment enabling the applications for which the machine controller proposed by the invention can be used to be extended. In this case, the sensor module 4 is designed as an outer wear part 21 and can therefore be worn over an item of clothing worn by the operator, a shoe in the example illustrated. The sensor module is therefore disposed on the item of clothing by means of a retaining device which can be adapted to the physiological circumstances, for example. The advantage of this compared with an item of clothing as such is that no specific design of the item of clothing is necessary. If, for example, several operators are able to work on a machine tool, this embodiment does not require a specific item of clothing to be made for each of them, which represents a major cost advantage. The active operator in question pulls on the outer wear part over his item of clothing and can then operate the machine tool.

Although not illustrated, another possible embodiment is one where the sensor module is designed as a sole insert for a shoe. This sole insert can be inserted in any shoe, given its slim thickness, without significantly impairing wearing comfort. This therefore offers another universal application.

Another embodiment might be one where the sensor module and the evaluation module are integrated and designed as a push-in module, which is pushed into an available recess of the item of clothing. In the case of a shoe, this module could be pushed into the region of the front sole so that the convertor of the sensor module is disposed in the region of the front part of the foot, thereby enabling the forces and accelerations applied by the operator to be detected.

FIG. 6 provides a simplified illustration of how the position locating or position detecting system of the machine controller proposed by the invention works. A major safety aspect resides in the fact that a control signal is not emitted unless the operator triggering this control signal is located within a fixed working range. For example, in the case of known foot switches, it is possible for an operator to stay in an area at risk or behind the machine tool, and the machine tool can be activated by another operator.

By providing a position locating or position detecting system, it is now possible to pinpoint the location of an operator triggering the signal profile or control signal so accurately that safety-related requirements can always be complied with. To this end, at least two co-operating receiver stations 27 are disposed on a front face 29 of the machine tool 1, configured to receive an HF and an ultra-sound signal. An HF signal is sent from the transmitter and receiver means 10 of the evaluation module 9 across the second signal connection 11 and at the same time, an ultra-sound signal is transmitted by means of a sound source across the third signal connection 23. Since a sound signal has a significantly lower propagation speed than an HF wave, the sound signal will arrive later at the co-operating receiver stations 27, creating a time difference. A circular range 30 can be determined from this time difference for each co-operating receiver station 27, and by intersecting circular ranges 30 of at least two co-operating receiver stations, the position of the sender of the signals can be determined. The more circular ranges there are available for determining the intersection point, the more accurately the position can be determined and the less susceptible the system is to interference. Consequently, a reliable working range 31 in which the operator must stay in order to be able to emit a control signal can be fixed. In the preferred embodiment with 5 co-operating receiver stations 27, the position can be determined to an accuracy of within 30 cm.

Since a machine tool is usually a very solid item, disposing the co-operating receiver stations 27 on the front 29 as far as possible prevents signals from a lateral or rearward direction from being blocked by the machine.

At least one of the co-operating receiver stations 27 will also be provided with a transmitter means to enable commands to be transmitted from the control module 5 to the evaluation module 9, as described above.

The examples illustrated here relate to a shoe as the item of clothing in which the sensor module and optionally the evaluation module can be disposed. The same advantages can be achieved if the item of clothing is a glove. This would also ensure that the operator would be in a position to issue control commands without having to turn his attention away from the workpiece or working area.

In the drawing of the evaluation module, the memory means and the comparison module of the evaluation module are not illustrated. At least one reference signal profile is stored in the memory means, which is compared by the comparison module with the signal profile generated from the detected electric characteristic variables in order to generate the control signal therefrom. The comparison module runs a check to ascertain whether the detected signal profile can be matched with a stored reference signal profile, the match preferably being checked on a fuzzy basis. For example, a check is run to ascertain whether the timings stored in the reference profile are there and whether the increase in the applied force or the relative intensity values of the individual sections can be matched with a reference signal profile.

The embodiments illustrated as examples represent possible variants of the machine controller proposed by the invention, and it should be pointed out at this stage that the invention is not specifically limited to the variants specifically illustrated, and instead the individual variants may be used in different combinations with one another and these possible variations lie within the reach of the person skilled in this technical field given the disclosed technical teaching. Accordingly, all conceivable variants which can be obtained by combining individual details of the variants described and illustrated are possible and fall within the scope of the invention.

For the sake of good order, finally, it should be pointed out that, in order to provide a clearer understanding of the structure of the machine controller, it and its constituent parts are illustrated to a certain extent out of scale and/or on an enlarged scale and/or on a reduced scale.

The objective underlying the independent inventive solutions may be found in the description.

Above all, the individual embodiments of the subject matter illustrated in the drawings constitute independent solutions proposed by the invention in their own right. The objectives and associated solutions proposed by the invention may be found in the detailed descriptions of these drawings.

LIST OF REFERENCE NUMBERS

| | |
|---|---|
| 1 | Machine tool |
| 2 | Operator |
| 3 | Press beam |
| 4 | Sensor module |
| 5 | Control module |
| 6 | Drive means |
| 7 | Item of clothing |
| 8 | First signal connection |
| 9 | Evaluation module |
| 10 | Transmitter and receiver module of the evaluation module |
| 11 | Second signal connection |
| 12 | Transmitter and receiver module of the control module |
| 13 | Electrical energy storage |
| 14 | Transmitter means |
| 15 | Receiver means |
| 16 | Time axis |
| 17 | Measure |
| 18 | Minimum |
| 19 | Maximum |
| 20 | Workpiece |
| 21 | Outer wear part |
| 22 | Signal profile |
| 23 | Third signal connection |
| 24 | Control part |
| 25 | Pressure sensor |
| 26 | Acceleration sensor |
| 27 | Co-operating receiver station |
| 28 | Position locating or position identifying module |
| 29 | Front |
| 30 | Circular range |
| 31 | Working range |

The invention claimed is:

1. Machine controller comprising a sensor module (4), an evaluation module (9) and a control module (5) in which the control module (5) has means for activating or deactivating at least one drive means (6) of a machine tool (1) on the basis of an incoming control signal, the sensor module (4) also having a convertor which converts a command into a proportional electric characteristic variable, the command comprising a physical variable acting on the sensor module (4) for a period of time, the evaluation module (9) being connected via a first signal connection (8) to the sensor module (4) and via a two-way second signal connection (11) to the control module (5), and in addition at least one of the two signal connections (8, 11) is a high-frequency local area data link, and the sensor module (4) is disposed on or in a shoe, wherein the evaluation module (9) generates a signal profile from the detected electric signal by running an analysis of potential and/or change, wherein the evaluation module (9) has a memory means in which a reference signal profile having a threshold value for an intensity of the signal is stored, the evaluation module (9) also has a comparison module which compares the detected signal profile with the stored signal profile and generates the control signal to activate or deactivate the at least one drive means when there is a rise above or drop below the threshold value throughout the period of time, and the control module (5) has a position locating or position identifying module (28) with at least two co-operating receiver stations (27) wherein an ultra-sound based wireless third signal connection (23) exists between the evaluation module (9) and the receiver stations (27), and the position locating or position identifying module (28) is configured to evaluate the travel time difference of the signals emitted simultaneously from the evaluation module (9) across the second (11) and third (23) signal connections and from this, information pertaining to position is determined.

2. Machine controller according to claim 1, wherein at least the sensor module (4) is provided in the form of an outer wear part.

3. Machine controller according to claim 1, wherein the sensor module (4) and the evaluation module (9) are disposed in an integrated arrangement and the second signal connection (11) between the integrated modules (4, 9) and the control module (5) is based on a wireless design.

4. Machine controller according to claim 3, wherein the arrangement of the sensor module (4) and the evaluation module (9) is designed as a push-in module.

5. Machine controller according to claim 3, wherein an actuator is connected to the evaluation module (9).

6. Machine controller according to claim 1, wherein the evaluation module (9) and the control module (5) are disposed in an integrated arrangement, and the first signal connection (8) between the sensor module (4) and the integrated modules (9, 5) is based on a wireless design.

7. Machine controller according to claim 1, wherein at least one sequence of time-discrete changes in signal value is stored in the signal profile (22).

8. Machine controller according to claim 1, wherein the convertor is provided in the form of a pressure sensor.

9. Machine controller according to claim 1, wherein the convertor is provided in the form of a threshold sensor and has at least one threshold value.

10. Machine controller according to claim 1, wherein the convertor is provided in the form of an acceleration sensor.

11. Machine controller according to claim 1, wherein the convertor is provided in the form of an active component.

12. Method of operating a machine tool, comprising a machine controller,
wherein the machine controller comprises a sensor module (4), an evaluation module (9) and a control module (5) in which the control module (5) has means for activating or deactivating at least one drive means (6) of a machine tool (1) on the basis of an incoming control signal, the sensor module (4) also having a convertor, the evaluation module (9) being connected via a first signal connection (8) to the sensor module (4) and via a two-way second signal connection (11) to the control module (5), and in addition at least one of the two signal connections (8, 11) is a high-frequency local area data link, and the sensor module (4) is disposed on or in a shoe, the evaluation module (9) has a memory means in which a reference signal profile having a threshold value for an intensity of the signal is stored, the evaluation module (9) also has a comparison module, and the control module (5) has a position locating or position identifying module (28) with at least two co-operating receiver stations (27), wherein an ultra-sound based wireless third signal connection (23) exists between the evaluation module (9) and the receiver stations (27), and the position locating or position identifying module (28) is configured to evaluate the travel time difference of the signals emitted simultaneously from the evaluation module (9) across the second (11) and third (23) signal connections and from this, information pertaining to position is determined, the method comprising:

detecting via the convertor of the sensor module a command from an operator, the command comprising a physical variable acting on the sensor module for a period of time, transmitting the command to the evaluation module as an electric characteristic variable, generating via the evaluation module a signal profile from the electric characteristic variable, comparing via the evaluation module the generated signal profile with the stored signal profile, and generating on a basis of the comparison the control signal to activate or deactivate the at least one drive means when there is a rise above or drop below the threshold value throughout the period of time.

13. Method according to claim 12, wherein the evaluation module determines the rate of change in the electric characteristic variable.

14. Method according to claim 12, wherein the sensor module has an identification code which is transmitted to the evaluation module or to the control module.

* * * * *